(12) United States Patent
Sanghai et al.

(10) Patent No.: US 9,557,993 B2
(45) Date of Patent: Jan. 31, 2017

(54) PROCESSOR ARCHITECTURE AND METHOD FOR SIMPLIFYING PROGRAMMING SINGLE INSTRUCTION, MULTIPLE DATA WITHIN A REGISTER

(71) Applicants: Kaushal Sanghai, Somerville, MA (US); Michael G. Perkins, Edinburgh (GB); Andrew J. Higham, Edinburgh (GB)

(72) Inventors: Kaushal Sanghai, Somerville, MA (US); Michael G. Perkins, Edinburgh (GB); Andrew J. Higham, Edinburgh (GB)

(73) Assignee: Analog Devices Global, Hamilton (BM)

( * ) Notice: Subject to any disclaimer, the term of this patent is extended or adjusted under 35 U.S.C. 154(b) by 863 days.

(21) Appl. No.: 13/738,858

(22) Filed: Jan. 10, 2013

(65) Prior Publication Data

US 2014/0115301 A1    Apr. 24, 2014

Related U.S. Application Data

(60) Provisional application No. 61/717,534, filed on Oct. 23, 2012.

(51) Int. Cl.
  *G06F 9/30*    (2006.01)
  *G06F 9/38*    (2006.01)
  *G06F 9/32*    (2006.01)

(52) U.S. Cl.
  CPC ......... *G06F 9/30018* (2013.01); *G06F 9/3012* (2013.01); *G06F 9/30036* (2013.01);
  (Continued)

(58) Field of Classification Search
  CPC .............. G06F 9/30036; G06F 9/30065; G06F 9/30072; G06F 9/30109; G06F 9/3012; G06F 9/3887; G06F 9/30018; G06F 9/30; G06F 9/30029; G06F 9/00; G06F 9/22; G06F 9/381; G06F 9/325
  See application file for complete search history.

(56) References Cited

U.S. PATENT DOCUMENTS 4,763,251 A * 8/1988 Kauffman, Jr. ......... G06T 3/606
                                                    711/219
5,555,428 A    9/1996 Radigan et al.
(Continued)

FOREIGN PATENT DOCUMENTS

EP            1267257         12/2002
WO    WO2013/089717           6/2013

OTHER PUBLICATIONS

EP Office Action in EP Patent Application Serial No. 13187965.2 mailed Dec. 3, 2014, 4 pages.
(Continued)

Primary Examiner — Farley Abad
(74) Attorney, Agent, or Firm — Patent Capital Group

(57) ABSTRACT

The present disclosure provides a processor, and associated method, for performing parallel processing within a register. An exemplary processor may include a processing element having a compute unit and a register file. The register file includes a register that is divisible into lanes for parallel processing. The processor may further include a mask register and a predicate register. The mask register and the predicate register respective include a number of mask bits and predicate bits equal to a maximum number of divisible lanes of the register. A state of the mask bits and predicate bits is set to respectively achieve enabling/disabling of the lanes from executing an instruction and conditional performance of an operation defined by the instruction. Further, the processor is operable to perform a reduction operation (Continued)

across the lanes of the processing element and/or generate an address for each of the lanes of the processing element.

36 Claims, 5 Drawing Sheets

(52) U.S. Cl.
CPC ...... *G06F 9/30065* (2013.01); *G06F 9/30072* (2013.01); *G06F 9/30109* (2013.01); *G06F 9/325* (2013.01); *G06F 9/3887* (2013.01)

(56) References Cited

U.S. PATENT DOCUMENTS

| | | | |
|---|---|---|---|
| 6,115,808 A * | 9/2000 | Arora | G06F 9/30094 712/210 |
| 7,039,906 B1 | 5/2006 | Trelewicz et al. | |
| 7,127,593 B2 | 10/2006 | Wilson | |
| 8,190,854 B2 | 5/2012 | Codrescu et al. | |
| 8,260,002 B2 | 9/2012 | Almbladh | |
| 8,401,327 B2 | 3/2013 | Almbladh | |
| 2002/0199086 A1 * | 12/2002 | Wilson | G06F 9/30014 712/226 |
| 2005/0278514 A1 * | 12/2005 | Wilson | G06F 9/30094 712/234 |
| 2008/0016320 A1 | 1/2008 | Menon et al. | |
| 2010/0082949 A1 | 4/2010 | Almbladh | |
| 2010/0312988 A1 * | 12/2010 | Bjorklund | G06F 9/30072 712/3 |
| 2011/0066813 A1 * | 3/2011 | Mantor | G06F 9/3851 711/147 |
| 2012/0198425 A1 * | 8/2012 | Eichenberger | G06F 8/456 717/140 |
| 2014/0095842 A1 * | 4/2014 | Caprioli | G06F 9/30036 712/222 |

OTHER PUBLICATIONS

Response to EP Office Action in EP Patent Application Serial No. 13187965.2 filed Oct. 30, 2014, 10 pages.
European Search Report in EPO Application Serial No. 13187965. 2-1957 mailed Jan. 21, 2014, 5 pages.
Dietz, Hank, "4. SIMD Within a Register (e.g. Using MMX)," *Linux Parallel Processing HOWTO*, v.2.0 dated Jun. 28, 2004 [Table of contents included, along with Chapter 4] http://tldlp.org/HOWTO/Parallel-Processing-HOWTO.html.
Response to EP Office Action in EP Patent Application Serial No. 13187965.2 filed Apr. 2, 2015, 10 pages.
Forsyth, Tom, SIMD Programming with Larrabee, Intel® VCG Visual Computing Group, 80 pages.
Office Action (1) is CN Application Serial No. 201310503908.X mailed Nov. 10, 2015.

* cited by examiner

PROCESSOR ARCHITECTURE AND METHOD FOR SIMPLIFYING PROGRAMMING SINGLE INSTRUCTION, MULTIPLE DATA WITHIN A REGISTER

This application is a non-provisional application of U.S. Provisional Patent Application Ser. No. 61/717,534, filed Oct. 23, 2012, which is hereby incorporated by reference in its entirety.

TECHNICAL FIELD

The present disclosure relates generally to processors that perform parallel processing, such as vector processors, and more particularly, to processors that perform parallel processing within registers.

BACKGROUND

Parallel processing is often implemented by a processor to optimize processing applications, for example, by a digital signal processor to optimize digital signal processing applications. A processor can operate as a single instruction, multiple data (SIMD), or data parallel, processor to achieve parallel processing. In SIMD operations, a single instruction is sent to a number of processing elements of the processor, where each processing element can perform a same operation on different data. A growing demand for continually higher throughput and increased performance has led to the implementation of SIMD within a register (SWAR), where the processing elements can operate on multiple sets of data within their associated registers. Although SWAR is relatively inexpensive to implement in a processor's hardware, SWAR poses challenges from a programming perspective. For example, SWAR programming typically necessitates intrinsics, inline assembly, and/or specialized vector data types (such as float2, int4, short4, etc.) from a high level language such as C/C++, which are not part of the ANSI C standards (standards published by American National Standards Institute (ANSI) for C programming language). Because such programming options (specialized vector data types, intrinsics, and/or inline assembly) are processor specific, SWAR programming presents difficulty in porting legacy code. Further, since SWAR programming adds an additional level of parallel processing on a vector processor, conventional processors burden the programmer with ensuring that the processor recognizes the two levels of parallel operation (two-way parallelism): one level of parallel processing within the processing elements (utilizing SWAR) and another level of parallel processing across the processing elements of a vector unit of the processor. Accordingly, although existing processor architectures for performing parallel processing, and associated methods, have been generally adequate for their intended purposes, they have not been entirely satisfactory in all respects.

BRIEF DESCRIPTION OF DRAWINGS

The present disclosure is best understood from the following detailed description when read with the accompanying figures. It is emphasized that, in accordance with the standard practice in the industry, various features are not drawn to scale and are used for illustration purposes only. In fact, the dimension of the various features may be arbitrarily increased or reduced for clarity of discussion.

OVERVIEW OF EXAMPLE EMBODIMENTS

Figure 1:
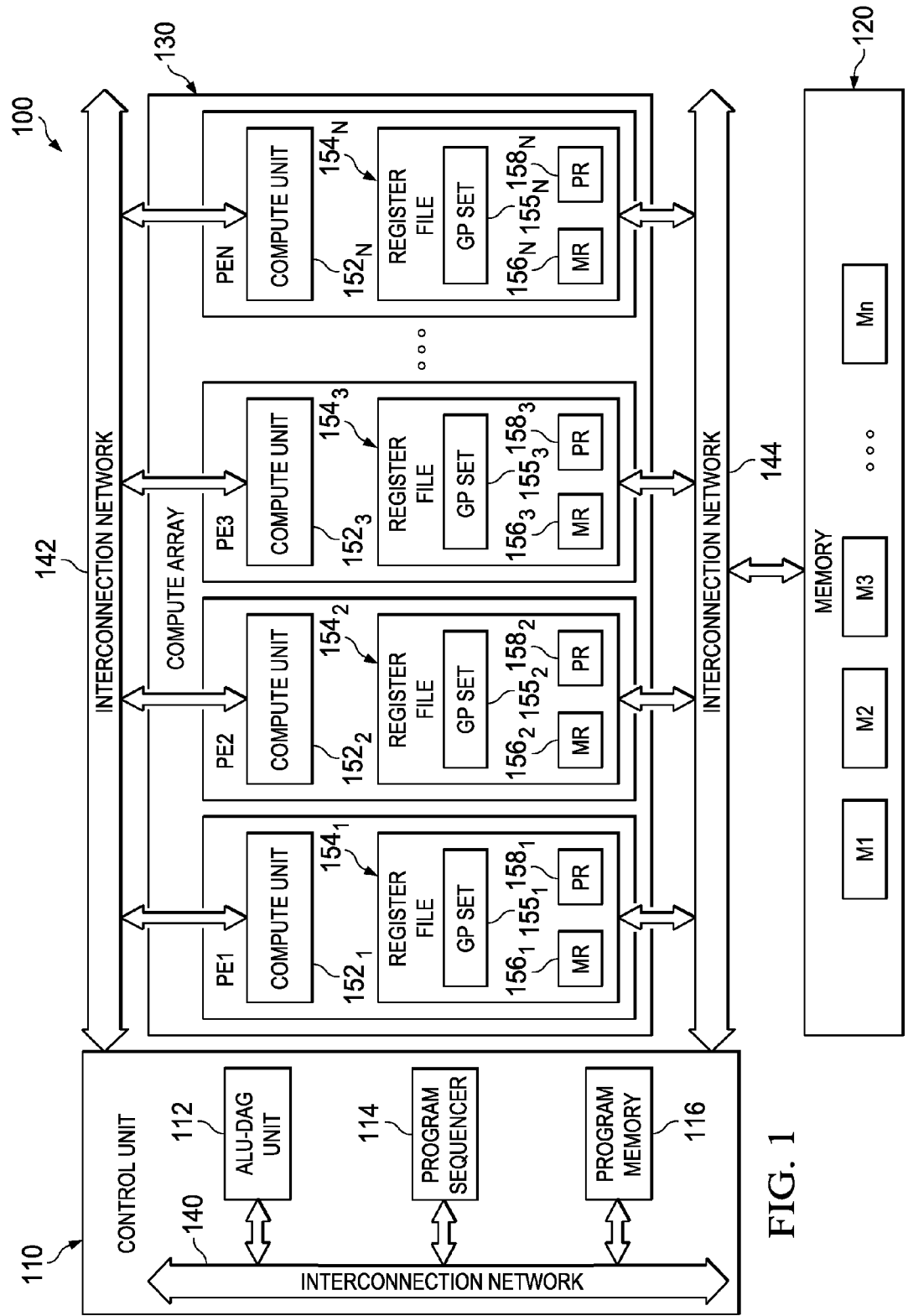
FIG. 1 is a schematic block diagram of an example digital signal processor according to various aspects of the present disclosure.

The present disclosure provides for various processor embodiments to be implemented in any suitable computing environment. One exemplary embodiment provides a processor that includes a processing element having a compute unit and a register file, wherein the register file includes a register that is divisible into lanes for parallel processing; and a masking register (also referred to as a mask/predicate register) associated with the processing element, wherein the masking register includes a number of bits equal to a maximum number of divisible lanes of the register, such that the lanes have corresponding bits. In various implementations, the processing element is operable to set the bits to one of the first state and the second state based on a loop instruction, where the processing element is operable to enable lanes having corresponding bits of the first state to execute an instruction and disable lanes having corresponding bits of the second state from executing the instruction. In various implementations, the processing element is operable to set the bits to one of the first state and the second state based on a compare instruction, where the processing element is operable to perform an operation defined by the instruction in lanes having corresponding bits of the first state and not perform the operation defined by the instruction in lanes having corresponding bits of the second state.

Another exemplary embodiment provides a processor that includes processing element having a compute unit and a register file, where the register file includes a register that is divisible into lanes for parallel processing. A mask register may be associated with the processing element, where the mask register includes a number of mask bits equal to a maximum number of divisible lanes of the register, such that the lanes have corresponding mask bits. A predicate register may also be associated with the processing element, where the predicate register includes a number of predicate bits equal to the maximum number of divisible lanes, such that the lanes have corresponding predicate bits. The compute unit may include an arithmetic logic unit, a multiplier-accumulator, and a shifter.

In various implementations, the processing element is operable to enable lanes having corresponding mask bits of a first state to execute an instruction; and disable lanes having corresponding mask bits of a second state from executing the instruction. In various implementations, the processing element is further operable to perform an operation defined by the instruction in lanes having corresponding predicate bits of a third state; and not perform the operation defined by the instruction in lanes having corresponding predicate bits of a fourth state. In an example, the first digital state and the third digital state are a same state, and the second digital state and the fourth digital state are a same state. In an example configuration, the processing element is operable to set the mask bits to the first state or the second state based on a loop count of an operation associated with the instruction. In various implementations, for a last iteration of a loop, the processing element can set the mask bits to the first state or the second state depending on a trip count of the loop. For example, the processing element may set at least one of the mask bits to the second state for the last iteration of the loop. In another example, the processing elements may set all the mask bits to the first state for the last iteration of the loop. In an example configuration, the processing element is operable to set the predicate bits to the third state or the fourth state based on a condition of the lane that corresponds with the predicate bits. For example, the processing element may set the predicate bits to the third state, and then, perform a comparison operation to determine whether any of the predicate bits should be changed to the fourth state. In various implementations, a lane has more than one corresponding predicate bit and the processing element is operable to set all corresponding predicate bits based on a condition of the lane. In various implementations, the processing element is operable to perform an operation across more than one lane.

In some embodiments, a method to be performed by a processor includes issuing an instruction to a processing element that includes a register divisible into processing lanes for parallel processing; setting mask bits corresponding with the processing lanes; setting predicate bits corresponding with the processing lanes; and executing, by at least one of the processing lanes, the instruction. In various implementations, a number of mask bits is equal to a maximum number of divisible processing lanes of the register and a number of predicate bits is equal to the maximum number of divisible processing lanes.

The method may further include enabling processing lanes having corresponding mask bits of a first state to execute the instruction; disabling processing lanes having corresponding mask bits of a second state from executing the instruction; performing an operation defined by the instruction in lanes having corresponding predicate bits of a third state; and/or not performing the operation defined by the instruction in lanes having corresponding predicate bits of a fourth state. In various implementations, setting the mask bits corresponding with the processing lanes includes determining a loop count of a loop associated with the instruction; if the loop count is not equal to one, setting all the mask bits to the first state; and if the loop count is equal to one, setting each of the mask bits to the first state or the second state based on a trip count of the loop. In various implementations, setting the predicate bits includes setting the predicate bits to the third state or the fourth state based on a condition of the processing lane that corresponds with the predicate bits. In some embodiments, the setting includes setting the predicate bits to the third state; and performing a comparison operation to determine whether any of the predicate bits should be changed to the fourth state. In various implementations, a number of predicate bits is greater than a number of processing lanes, such that a processing lane has more than one corresponding predicate bit; and the setting the predicate bits includes setting the more than one corresponding predicate bit of the processing lane based on a condition of the processing lane.

In yet other embodiments, a single instruction, multiple data (SIMD) processor includes a compute array having a processing element that includes a register set divisible into a number of SIMD lanes; a mask register having a number of mask bits equal to a maximum number of divisible SIMD lanes, such that each SIMD lane has at least one corresponding mask bit; and a predicate register having a number of predicate bits equal to a maximum number of divisible SIMD lanes, such that each SIMD lane has at least one corresponding predicate bit. The processing element is operable to conditionally execute an instruction in at least one of the SIMD lanes based on a state of the mask bits and the predicate bits. In various implementations, the processing element is operable to enable the SIMD lanes having corresponding mask bits of a first state to execute an instruction; disable the SIMD lanes having corresponding mask bits of a second state from executing the instruction; perform an operation defined by the instruction in SIMD lanes having corresponding predicate bits of a third state; and/or not perform the operation defined by the instruction in SIMD lanes having corresponding predicate bits of a fourth state.

DETAILED DESCRIPTION OF EXAMPLE EMBODIMENTS

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed.

FIG. 1 is a schematic block diagram of an example digital signal processor 100 according to various aspects of the present disclosure. FIG. 1 has been simplified for the sake of clarity to better understand the inventive concepts of the present disclosure. Additional features can be added in digital signal processor 100, and some of the features described below can be replaced or eliminated in other embodiments of digital signal processor 100.

Digital signal processor 100 may include a control unit 110, a memory 120, and a compute array 130. In an example, the control unit 110 and the compute array 130 constitute a core processor that can perform computation and data processing functions of the digital signal processor 100. The digital signal processor 100 can include other components, such as a microcontroller for executing microcontroller instructions, a direct memory access (DMA) unit, and various interfaces to off-chip devices.

The control unit 110 facilitates program execution of the digital signal processor 100. The control unit 110 may include an arithmetic logic unit and data address generation (ALU-DAG) unit 112, a program sequencer 114, and a program memory 116. The control unit 110 can include other components, such as an instruction cache, a timer, and an instruction register. The ALU-DAG unit 112 supports general purpose integer computations and supplies addresses for memory addresses. For example, the ALU-DAG 112 provides memory addresses when data is transferred between memory (such as the memory 120) and registers (such as register files of the compute array 130, described below). The ALU-DAG unit 112 can supply addresses to data memory (for example, memory 120) and/or program memory 116. The program sequencer 114 provides instruction addresses to program memory 116 for instruction fetches. The program memory 116 stores programs that digital signal processor 100 implements to process data (such as that stored in the memory 120) and can also store process data. The programs include instruction sets having one or more instructions, and the digital signal processor 100 implements the programs by fetching the instructions, decoding the instructions, and executing the instructions. In an example, the programs may include instruction sets for implementing various digital signal processing algorithms.

The memory 120 stores information/data to be processed by the digital signal processor 100 (data memory), programs implemented by the digital signal processor 100 to process the information/data (program memory), or a combination thereof. In the depicted embodiment, the memory 120 has a multi-banked interleaved memory structure, such that the memory 120 includes memory banks M1, M2, M3, . . . Mn, where n is a total number of memory banks of the memory 120. In an example, the memory 120 is a random access memory, such as a static random access memory (SRAM). In an example, one or more of the memory banks M1, M2, M3, . . . Mn is a separate SRAM. Alternatively, in various implementations, the memory 120 is another suitable type of memory.

An interconnection network 140, an interconnection network 142, and an interconnection network 144 interconnect the control unit 110, the memory 120, and the compute array 130, thereby providing communication pathways between the control unit 110, the memory 120, and the compute array 130. The interconnection network 140, the interconnection network 142, and the interconnection network 144 include a single bus, multiple buses, a crossbar network, a single-stage network, a multistage network, other type of interconnection network, or combination thereof. The control unit 110 issues instructions and data addresses to the compute array 130 via the interconnection network 142. The interconnection network 142 thus transfers addresses for instructions and data to various processing elements PE1, PE2, PE3, . . . PEN of the compute array 130 via the interconnection network 142. The interconnection network 144 transfers data and/or instructions from memory (such as memory 120, program memory 116, other memory, or combination thereof), such that contents of any register in the digital signal processor 100 can be transferred to any other register or to any memory location and the memory 120 can provide data operands (values) to the compute array 130.

The compute array 130 includes processing elements PE1, PE2, PE3, . . . PEN, where N is a total number of processing elements of the compute array 130. In an example, the compute array 110 may include four processing elements (in other words, PE1, PE2, PE3, and PE4, where N=4). The processing elements PE1, PE2, PE3, . . . PEN perform numeric processing for digital signal processing algorithms. The processing elements PE1, PE2, PE3, . . . PEN operate independently, in parallel, or as a single instruction, multiple data (SIMD) engine. In the present example, each processing element PE1, PE2, PE3, . . . PEN is a vector processor. Alternatively, the processing elements PE1, PE2, PE3, . . . PEN are a combination of scalar processors and vector processors.

The processing elements PE1, PE2, PE3, . . . PEN include a respective computation unit (CU) $152_1$, $152_2$, $152_3$, . . . $152_N$. In the depicted embodiment, the computation units $152_1$, $152_2$, $152_3$, . . . $152_N$ are identical, although the present disclosure contemplates embodiments where the computation units are not identical. The present disclosure further contemplates configurations where one or more of the processing elements PE1, PE2, PE3, . . . PEN do not include a computation unit. In the present example, the computation units $152_1$, $152_2$, $152_3$, . . . $152_N$ include an arithmetic logic unit (ALU), a multiplier-accumulator (MAC), a shifter, other computational unit, or combinations thereof. The ALU can perform arithmetic and logic operations, such as add, subtract, negate, increment, decrement, absolute value, AND, OR, EXCLUSIVE OR, NOT, divide primitive, other arithmetic operations, other logic operations, or combinations thereof. The MAC can perform multiplication operations as well as multiply and accumulate operations, such as single-cycle multiply, multiply/add, multiply/subtract, other operations, or combinations thereof. The shifter can perform logical and arithmetic shifts, bit manipulations, normalization, denormalization, derive-exponent operations, other operations, or combinations thereof. The various arithmetic operations, logic operations, and other operations can be performed on both fixed-point and floating-point formats. In various embodiments, the ALU, MAC, and/or shifter include registers associated therewith.

The processing elements PE1, PE2, PE3, . . . PEN also include a respective register file $154_1$, $154_2$, $154_3$, . . . $154_N$. In the depicted embodiment, the register files $154_1$, $154_2$, $154_3$, . . . $154_N$ are identical, although the present disclosure contemplates embodiments where the register files are not identical. The present disclosure further contemplates configurations where one or more of the processing elements PE1, PE2, PE3, . . . PEN do not include a register file. The register files $154_1$, $154_2$, $154_3$, . . . $154_N$ include registers that transfer data between the processing elements PE1, PE2, PE3, . . . PEN and data interconnection networks (such as the interconnection network 144) and stores results. In the present example, the register files $154_1$, $154_2$, $154_3$, . . . $154_N$ can include a respective general purpose register set $155_1$, $155_2$, $155_3$, . . . $155_N$ that include general purpose registers having widths dependent on design requirements of the digital signal processor 100, such as 32-bit general purposes registers, 40-bit general purpose registers, 64-bit general purpose registers, 128-bit general purposes registers, other width general purpose registers, or a combination thereof. For purposes of the following discussion, the general purpose register sets $155_1$, $155_2$, $155_3$, . . . $155_N$ include 32-bit general purpose registers. In the present example, the register files $154_1$, $154_2$, $154_3$, . . . $154_N$ further include a respective mask register $156_1$, $156_2$, $156_3$, . . . $156_N$ and a respective predicate register $158_1$, $158_2$, $158_3$, . . . $158_N$, which are discussed in detail below. The register files $154_1$, $154_2$, $154_3$, . . . $154_N$ can include additional registers according to design requirements of the digital signal processor 100. Further, in various implementations, the mask registers $156_1$, $156_2$, $156_3$, . . . $156_N$ and/or the predicate registers $158_1$, $158_2$, $158_3$, . . . $158_N$ are one of the general purpose registers of the general purpose register sets $155_1$, $155_2$, $155_3$, . . . $155_N$.

The digital signal processor 100 can perform various parallel operations. For example, during a single cycle, the processing elements PE1, PE2, PE3, . . . PEN access an instruction (via interconnection network 142) and access N data operands from memory (via interconnection network 144) for synchronous processing. In single-instruction, multiple data (SIMD) mode, the digital signal processor 100 processes multiple data streams in parallel. For example, when in SIMD mode, the digital signal processor 100 in a single cycle can dispatch a single instruction to the processing elements PE1, PE2, PE3, . . . PEN via interconnection network 142; load N data sets from memory (memory 120, program memory 116, other memory, or combination thereof) via the interconnection network 144, one data set for any of the processing elements PE1, PE2, PE3, . . . PEN (in an example, each data set may include two data operands); execute the single instruction synchronously in processing elements PE1, PE2, PE3, . . . PEN; and store data results from the synchronous execution in memory (memory 120, program memory 116, other memory, or combination thereof).

Figure 2:
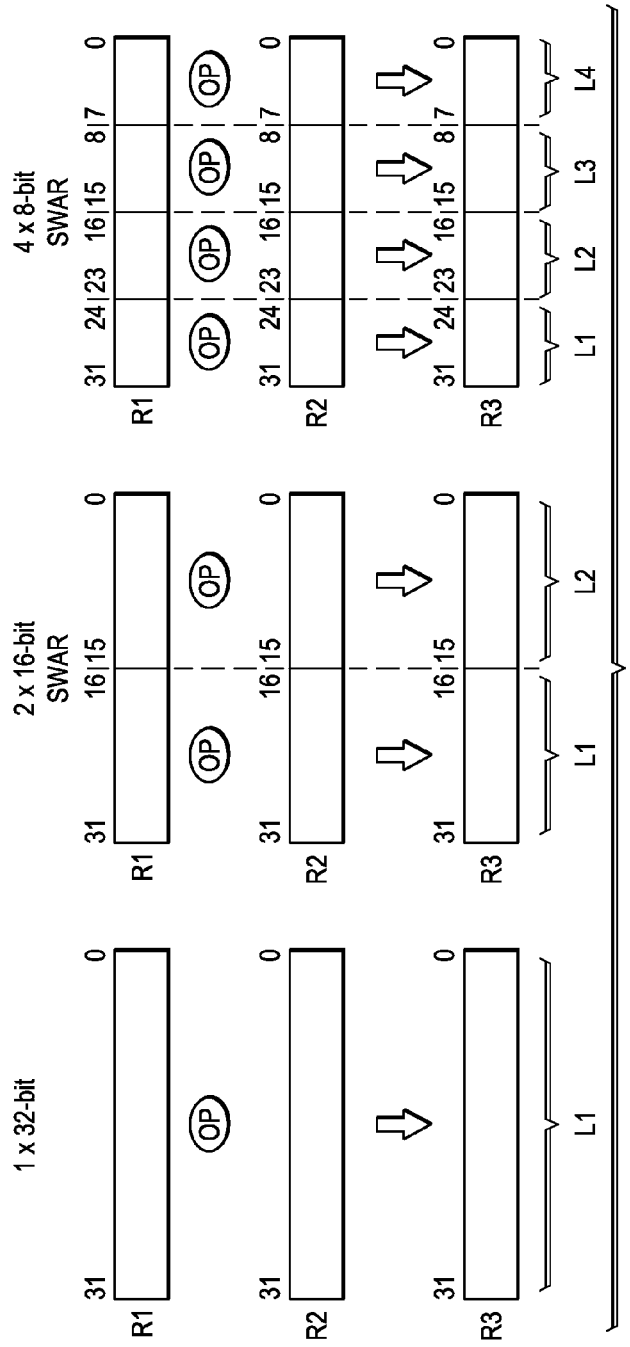
FIG. 2 schematically illustrates an example set of registers associated with a processing element, such as a processing element of the digital signal processor of FIG. 1, divided into different data sizes according to various aspects of the present disclosure.

The digital signal processor 100 can also perform SIMD within a register (SWAR), where the registers (for example, the general purpose registers) of any of the processing elements PE1, PE2, PE3, . . . PEN are divisible into more than one processing lane, such that any of the processing elements PE1, PE2, PE3, . . . PEN can individually perform parallel operations on their respective processing lanes. For example, in SWAR mode, any of the processing elements PE1, PE2, PE3, . . . PEN can perform parallel operations on n kin-bit lanes, where k is a width in bits of the registers and n is a number of lanes of the registers. FIG. 2 schematically illustrates an example set of registers associated with a processing element, such as the processing elements PE1, PE2, PE3, . . . PEN of the digital signal processor 100, that can implement SWAR according to various aspects of the present disclosure. In FIG. 2, a set of registers includes register R1, register R2, and register R3, where an operation (OP), such as an addition operation, is performed using elements (data operands) of register R1 and register R2 to produce a result in register R3. The registers R1, R2, and R3 can be general purpose registers, such as general purpose register sets $155_1$, $155_2$, $155_3$. In the present example, where the general purpose registers are 32-bits wide (k=32), in SIMD mode, any of the processing elements PE1, PE2, PE3, . . . PEN can perform an operation on 32-bit elements stored in registers R1 and R2 and place the result in register R3. In furtherance of the present example, in SWAR mode, the registers of the processing elements PE1, PE2, PE3, . . . PEN are divisible into more than one processing lane for parallel operations, such that any of the processing elements PE1, PE2, PE3, . . . PEN can perform parallel operations on two lanes (L1 and L2) of 16-bit elements stored in registers R1 and R2 and place the results in register R3 (referred to as 2×16-bit SWAR processing), or parallel operations on four lanes (L1-L4) of 8-bit elements stored in registers R1 and R2 and place the results in register R3 (referred to as 4×8-bit SWAR processing).

A growing demand for a digital signal processor to support high performance for wider data types (such as 64-bit floating point, 32-bit complex, etc.) has led to increasing computation power and register widths within the processing elements of the digital signal processor, such as the processing elements PE1, PE2, PE3, . . . PEN of the digital signal processor 100. The wider registers increase digital signal processor performance manifold for smaller data types (such as 32-bit floating point, 16-bit fixed-point, etc.) by implementing SWAR. For example, the digital signal processor 100 can execute operations twice to four times as quickly by implementing SWAR without adding more processing elements. In the example where there are four processing elements PE1, PE2, PE3, and PE4 having 32-bit wide registers, the digital signal processor 100 can perform four parallel 32-bit operations in SIMD or non-SIMD mode, eight parallel operations in 2×16-bit SWAR mode, or sixteen parallel operations in 4×8-bit SWAR mode in the same amount of time. Similarly, in an example where the processing elements PE1, PE2, PE3, and PE4 have 128-bit wide registers, the digital signal processor 100 can perform four parallel 128-bit operations in SIMD or non-SIMD mode, eight parallel 64-bit operations in 2×64-bit SWAR mode, sixteen parallel 32-bit operations in 4×32-bit SWAR mode, thirty two parallel 16-bit operations in 8×16-bit SWAR mode, or sixty four parallel 8-bit operations in 16×8-bit SWAR mode in the same amount of time.

Although SWAR mode is relatively inexpensive to implement in a digital signal processor's hardware, SWAR poses challenges from a programming perspective. For example, SWAR programming typically necessitates intrinsics, inline assembly, and/or specialized vector data types (such as float2, int4, short4, etc.) from a high level language such as C/C++, which are not part of the ANSI C standards (standards published by American National Standards Institute (ANSI) for C programming language). Because such programming options (specialized vector data types, intrinsics, and/or inline assembly) are processor specific, SWAR programming presents difficulty in porting legacy code. Further, since SWAR programming adds an additional level of parallel processing on a vector processor, conventional digital signal processors burden the programmer with ensuring that the digital signal processor recognizes the two levels of parallel operation (two-way parallelism): one level of parallel processing within the processing elements (utilizing SWAR) and another level of parallel processing across the processing elements of the vector unit.

The digital signal processor 100 disclosed herein enables a programmer (and thus a compiler of the digital signal processor) to view parallel processing units as a single vector lane, where each processing lane (SWAR lane) is viewed as an individual processing element. In an example where each processing element PE1, PE2, PE3, . . . PEN is divisible into a same number of processing lanes, the programmer sees an effective number of processing elements equal to a number of actual processing elements times a number of processing (SWAR) lanes per processing element. Accordingly, in the example where there are four processing elements PE1, PE2, PE3, and PE4 that support four processing lanes (for example, 32-bit wide registers that support 4×8 bit SWAR), from the programmer's perspective (and thus from the compiler's perspective), the effective number of processing elements is sixteen (effective number of PEs=number of PEs×number of SWAR lanes per PE=4×4=16). In another example, where there are eight processing elements and each processing element supports two processing lanes (for example, two 32-bit floating point operations), from the programmer's perspective, the effective number of processing elements is sixteen (effective number of PEs=number of PEs×number of SWAR lanes per PE=8×2=16). As described in detail below, the digital signal processor 100 makes SWAR processing (in particular, the two-way parallelism) seamless to a programmer by implementing (1) masking on a per processing lane (SWAR lane) basis, (2) conditional execution on a per processing lane basis, (3) performing reduction operations across processing lanes and/or across processing elements, and/or (4) independently generating addresses on a per processing lane basis. Such mechanisms substantially reduce programming effort required for the digital signal processor 100.

The digital signal processor 100 can mask parallel operations on a per processing lane (SWAR lane) basis. In the depicted embodiment, the processing elements PE1, PE2, PE3, . . . PEN have associated mask registers $156_1$, $156_2$, $156_3$, . . . $156_N$. The mask registers $156_1$, $156_2$, $156_3$, . . .

$156_N$ have a number of mask bits (a width) equal to a maximum number of divisible lanes of the registers of its associated processing element PE1, PE2, PE3, . . . PEN, where the mask bits correspond with lanes of the associated processing elements PE1, PE2, PE3, . . . PEN. Put another way, the mask register's number of mask bits is sufficient to control the smallest granularity of parallelism implemented by its associated processing element. For example, where the digital signal processor 100 includes four processing elements PE1, PE2, PE3, and PE4 having 32-bit wide general purpose register sets that support 1×32-bit, 2×16-bit, and/or 4×8-bit SWAR operations, a maximum number of divisible processing lanes is four and associated mask registers $156_1$, $156_2$, $156_3$, and $156_4$ include four mask bits (in other words, a four bit wide mask register), where one mask bit corresponds with each processing lane when performing 4×8-bit operations, two mask bits correspond with each processing lane when performing 2×16-bit operations, and four mask bits correspond with each processing lane when performing 1×32-bit operations. In alternative embodiments, instead of the processing elements PE1, PE2, PE3, . . . PEN having respective mask registers $156_1$, $156_2$, $156_3$, . . . $156_N$, the digital signal processor 100 can include a single mask register having a number of mask bits (a width) equal to a maximum number of processing lanes supported by the digital signal processor 100.

The mask bits associated with each processing element PE1, PE2, PE3, . . . PEN (and particularly corresponding with each processing lane) can be set by the control unit 110 or respective processing element PE1, PE2, PE3, . . . PEN during program execution. In an example, described in detail below, the digital signal processor 100 sets the mask bits based on a vector length of a vector. The mask bits control operating states of their corresponding lanes. For example, the digital signal processor 100 (or processing elements PE1, PE2, PE3, . . . PEN) enables lanes having corresponding mask bits of a first state (for example, TRUE) to execute an instruction and disables lanes having corresponding mask bits of a second state (for example, FALSE) from executing the instruction. What indicates the first state (such as "TRUE") and second state (such as "FALSE") can vary depending on design requirements of the digital signal processor 100. In various implementations, the first state is "TRUE" when the mask bit has a value of "1" and the second state is "FALSE" when the mask bit has a value of "0", such that lanes having corresponding mask bits with a value of "1" are enabled to execute an instruction and lanes having corresponding mask bits with a value of "0" are disabled from executing the instruction. In other implementations, the first state is "TRUE" when the mask bit has a value of "0" and the second state is "FALSE" when the mask bit has a value of "1", such that lanes having corresponding mask bits with a value of "0" are enabled to execute an instruction and lanes having corresponding mask bits with a value of "1" are disabled from executing the instruction.

Figure 3:
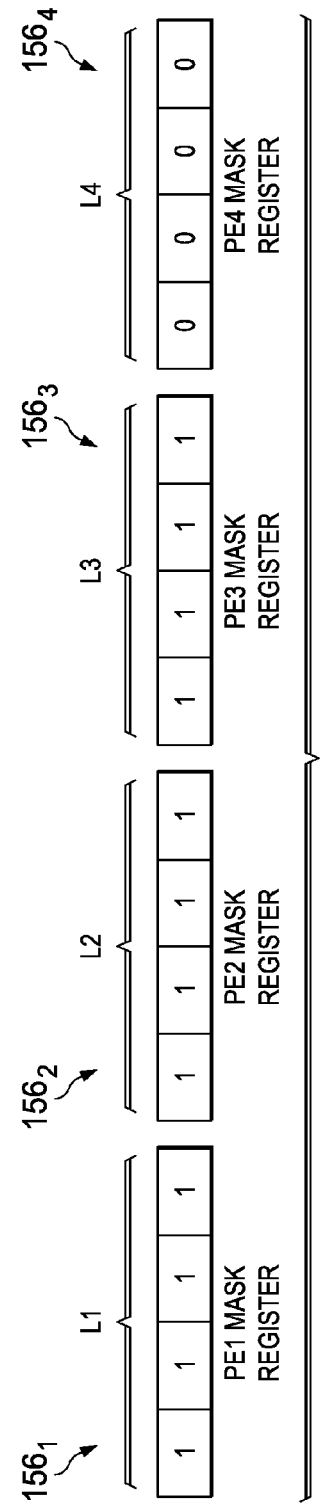
FIG. 3, FIG. 4, and FIG. 5 schematically illustrate a group of mask registers, such as a group of mask registers associated with the digital signal processor of FIG. 1, set to achieve different masking schemes on a per processing lane basis according to various aspects of the present disclosure.
Figure 4:
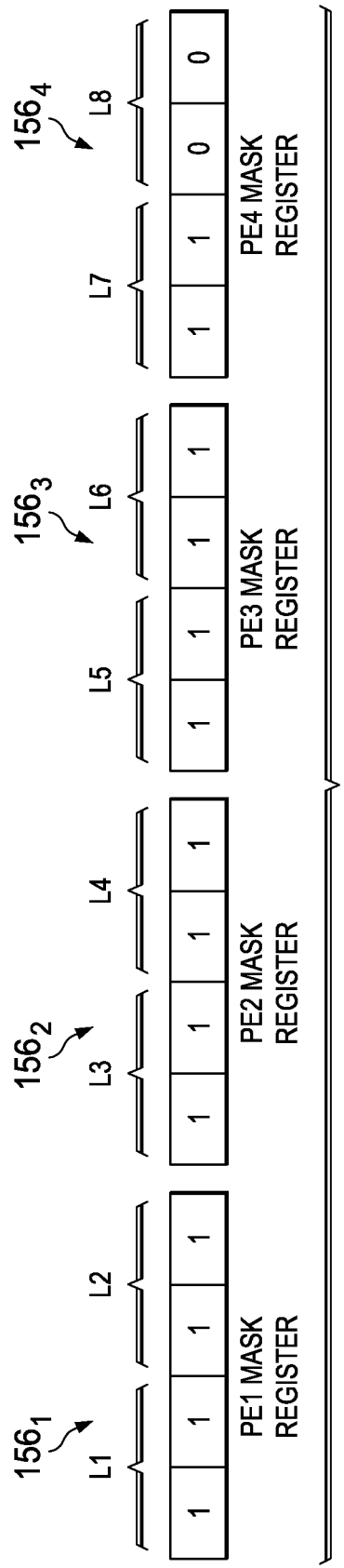
Figure 5:
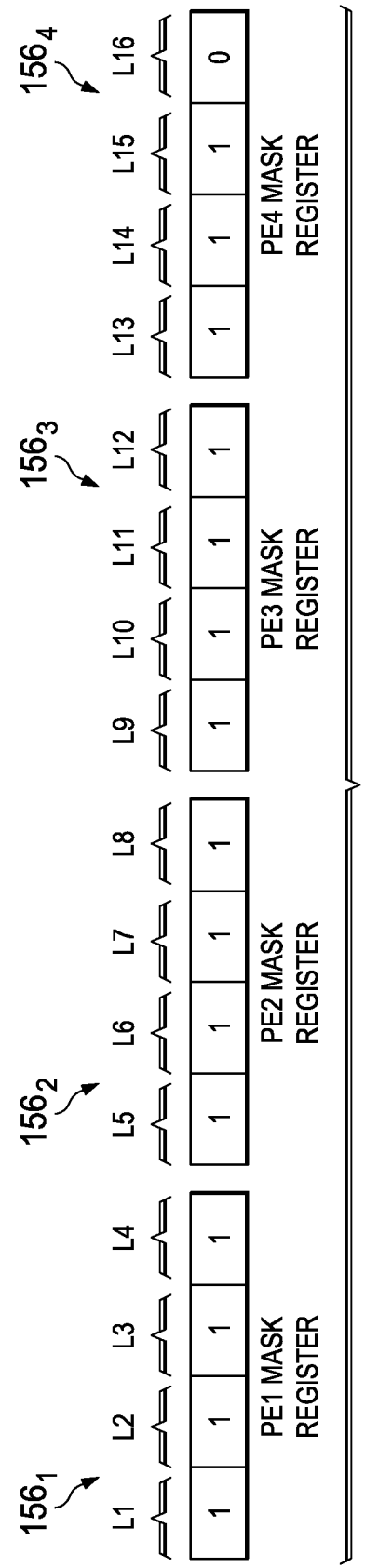

FIG. 3, FIG. 4, and FIG. 5 illustrate a group of mask registers set to achieve masking on a per processing lane basis depending on an operation type implemented by a digital signal processor according to various aspects of the present disclosure. For example, FIG. 3 illustrates an example of mask registers $156_1$, $156_2$, $156_3$, and $156_4$ set to mask a processing lane while the digital signal processor 100 performs 1×32-bit operations; FIG. 4 illustrates an example of mask registers $156_1$, $156_2$, $156_3$, and $156_4$ set to mask a processing lane while the digital signal processor 100 performs 2×16-bit operations; and FIG. 5 illustrates an example of mask registers $156_1$, $156_2$, $156_3$, and $156_4$ set to mask a processing lane while the digital signal processor 100 performs 4×8-bit operations.

In FIG. 3, when the digital signal processor 100 performs 32-bit operations, the processing elements PE1, PE2, PE3, and PE4 can perform four parallel operations (four lanes L1-L4 for parallel processing), and all mask bits associated with a processing element are collectively set to TRUE or FALSE. For example, where there are four parallel processors and the digital signal processor 100 implements an operation having a trip count of three, the digital signal processor 100 sets the mask bits such that processing elements PE1, PE2, and PE3 are enabled to execute an instruction associated with the trip count while the processing element PE4 is disabled from executing the instruction. Specifically, all mask bits of the mask register $156_1$ associated with the processing element PE1 are set to "1", all mask bits of the mask register $156_2$ associated with the processing element PE2 are set to "1", all mask bits of the mask register $156_3$ associated with the processing element PE3 are set to "1", and all mask bits of the mask register $156_4$ associated with the processing element PE4 are set to "0".

In FIG. 4, when the digital signal processor 100 performs 16-bit operations and implements 2×16-bit SWAR processing, the processing elements PE1, PE2, PE3, and PE4 perform two parallel lane operations, and the digital signal processor 100 collectively sets pairs of mask bits corresponding with a processing lane to TRUE or FALSE. For example, in FIG. 4, where there are essentially eight parallel processors (eight lanes L1-L8 for parallel processing) and the digital signal processor 100 implements an operation having a trip count of seven, the digital signal processor 100 sets the mask bits such that all lanes of the processing elements PE1, PE2, and PE3 (L1-L6) are enabled to execute an instruction associated with the loop count, one of the lanes (L7) of the processing element PE4 is enabled to execute the instruction, and the other lane (L8) of the processing element PE4 is disabled from executing the instruction. Specifically, for mask register $156_1$ associated with the processing element PE1, a first pair of mask bits and a second pair of mask bits respectively corresponding to the processing lanes L1 and L2 are set to "1"; for mask register $156_2$ associated with the processing element PE2, a first pair of mask bits and a second pair of mask bits respectively corresponding to the processing lanes L3 and L4 are set to "1"; for mask register $156_3$ associated with the processing element PE3, a first pair of mask bits and a second pair of mask bits respectively corresponding to the processing lanes L5 and L6 are set to "1"; and for mask register $156_4$ associated with the processing element PE4, a first pair of mask bits corresponding to processing lane L7 are set to "1" and a second pair of mask bits corresponding to processing lane L8 are set to "0".

Similarly, in FIG. 5, when the digital signal processor 100 performs 8-bit operations and thus implements 4×8-bit SWAR, the processing elements PE1, PE2, PE3, and PE4 perform four lane parallel operations, and the digital signal processor 100 individually sets the mask bits associated with a processing lane to TRUE or FALSE. For example, in FIG. 5, where there are essentially sixteen parallel processors (sixteen lanes L1-L16 for parallel processing) and the digital signal processor 100 implements an operation having a trip count of fifteen, the digital signal processor 100 sets the mask bits such that all lanes of the processing elements PE1, PE2, and PE3 (L1-L12) are enabled to execute an instruction associated with the trip count, three of the lanes of the processing element PE4 (L13-L15) are enabled to execute the instruction, and one of the lanes of the processing element PE4 (L16) is disabled from executing the instruction. Specifically, for mask register $156_1$ associated with the processing element PE1, the mask bits corresponding with the four processing lanes L1-L4 are set to "1"; for mask register $156_2$ associated with the processing element PE2, the mask bits corresponding with the four processing lanes L5-L8 are set to "1"; for mask register $156_3$ associated with the processing element PE3, the mask bits corresponding with the four processing lanes L9-L12 are set to "1"; and for mask register $156_4$ associated with the processing element PE4, the mask bits corresponding with the first three processing lanes L13-L15 are set to "1" and the mask bit corresponding with the fourth processing lane L16 is set to "0".

By masking operations on a per processing lane basis, the digital signal processor 100 can effectively operate on vector lengths that are at a granularity of the processing lanes. Masking individual processing lanes is particularly useful when dealing with operations at an end of a vector array. For a vector length N, when N % NPE is not equal to 0 (in other words, the vector length N is not a multiple of a number of processing elements (NPE)), the digital signal processor 100 can mask individual processing lanes from executing the instruction at a last iteration of a loop, without additional programming. Accordingly, in various implementations, the mask bits can effectively serve as a loop control when a loop length is not equal to a vector length. In contrast, conventional digital signal processors require the programmer to specifically program for situations where the vector length is not a default width of the processing elements and where the vector length is not a multiple of the number of processing lanes (in other words, where the loop length is not equal to the vector length).

Figure 6:
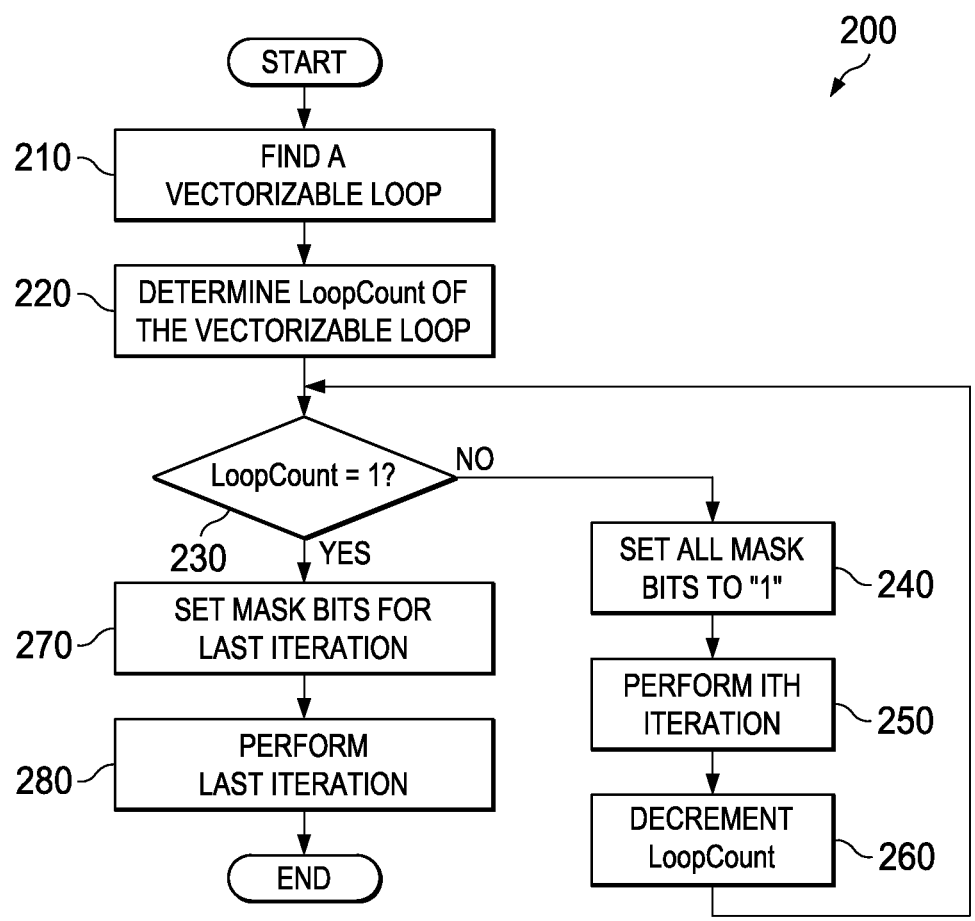
FIG. 6 is a flowchart of an example method for masking operations of individual processing lanes that can be performed by a digital signal processor, such as the digital signal processor of FIG. 1, according to various aspects of the present disclosure.

FIG. 6 is a flowchart of an example method 200 for masking operations on individual processing lanes that can be performed by a digital signal processor according to various aspects of the present disclosure. The method 200 begins at block 210 where the digital signal processor finds a vectorizable loop. In an example, the digital signal processor analyzes source code for a vectorizable loop (a loop for vectorization). A vectorizable loop indicates that more than one iteration of the loop can be executed at one time by the digital signal processor. In an example, vectorizing a loop unrolls the loop so that it can perform a same operation on multiple data in a single instruction. At block 220, the digital signal processor determines a loop count of the vectorizable loop. In various implementations, the loop count (LoopCount) is given by the following operation:

LoopCount=ceil(N/NLanes), where N is a vector length (number of elements in a vector) and NLanes is a number of processing lanes. At block 230, the digital signal processor determines whether the loop count is equal to one (LoopCount==1?). If the loop count is not equal to one, the method 200 continues to block 240 where a masking operation sets all mask bits to TRUE, enabling all processing lanes of the digital signal processor to execute an instruction associated with the vectorizable loop. In an example, where TRUE is represented by a value "1", the masking operation can be represented by the following:

MASK=2^NLanes-1, which sets all mask bits associated with the processing lanes to "1". At block 250, the digital signal processor performs an ith iteration of the vectorizable loop, where i=1 . . . n (n being the LoopCount determined at block 220). After performing the ith iteration, the loop count is decremented at block 260, and the method 200 returns to block 230 to determine again whether the loop count is equal to one. The method 200 repeats block 230, block 240, block 250, and block 260 until the loop count equals one. When the loop count equals one, the method 200 proceeds to block 270 where a masking operation sets mask bits for the last iteration (where at the last iteration, i=n=LoopCount determined at block 220). The masking operation can set each mask bit to a first state (such as TRUE or "1") or a second state (such as FALSE or "0") depending on the vectorizable loop's trip count (a number of times a body of the loop is executed). In various implementations, the masking operation sets all mask bits to TRUE for the last iteration of the loop, enabling all processing lanes to execute the instruction. For example, where the processing elements PE1, PE2, PE3, and PE4 perform 2×16-bit SWAR (thereby providing eight parallel processing lanes) and the loop has a trip count equal to sixteen (Trip Count=16), the loop iterates twice (initial LoopCount=2) and all mask bits are set to TRUE for both iterations. In various implementations, the masking operation sets at least one of the mask bits to FALSE for the last iteration of the loop, enabling some of the processing lanes to execute the instruction associated with the vectorizable loop and disabling some of the processing lanes from executing the instruction. For example, where the processing elements PE1, PE2, PE3, and PE4 perform 2×16-bit SWAR (thereby providing eight parallel processing lanes) and the loop has a trip count equal to fifteen (Trip Count=15), the loop still iterates twice (initial LoopCount=2), but all mask bits are set to TRUE for the first iteration and at least one mask bit is set to FALSE for the second iteration. In an example, where TRUE is represented by a value "1" and FALSE is represented by "0", the masking operation can be represented by the following:

MASK(for last iteration)=2^(Remainder((VectorLength+NLanes-1)/NLanes)+1)-1

At block 280, the digital signal processor performs the last iteration of the vectorizable loop. Additional steps can be provided before, during, and after the method 200 and some of the steps described can be replaced or eliminated for other embodiments of the method 200.

Figure 7:
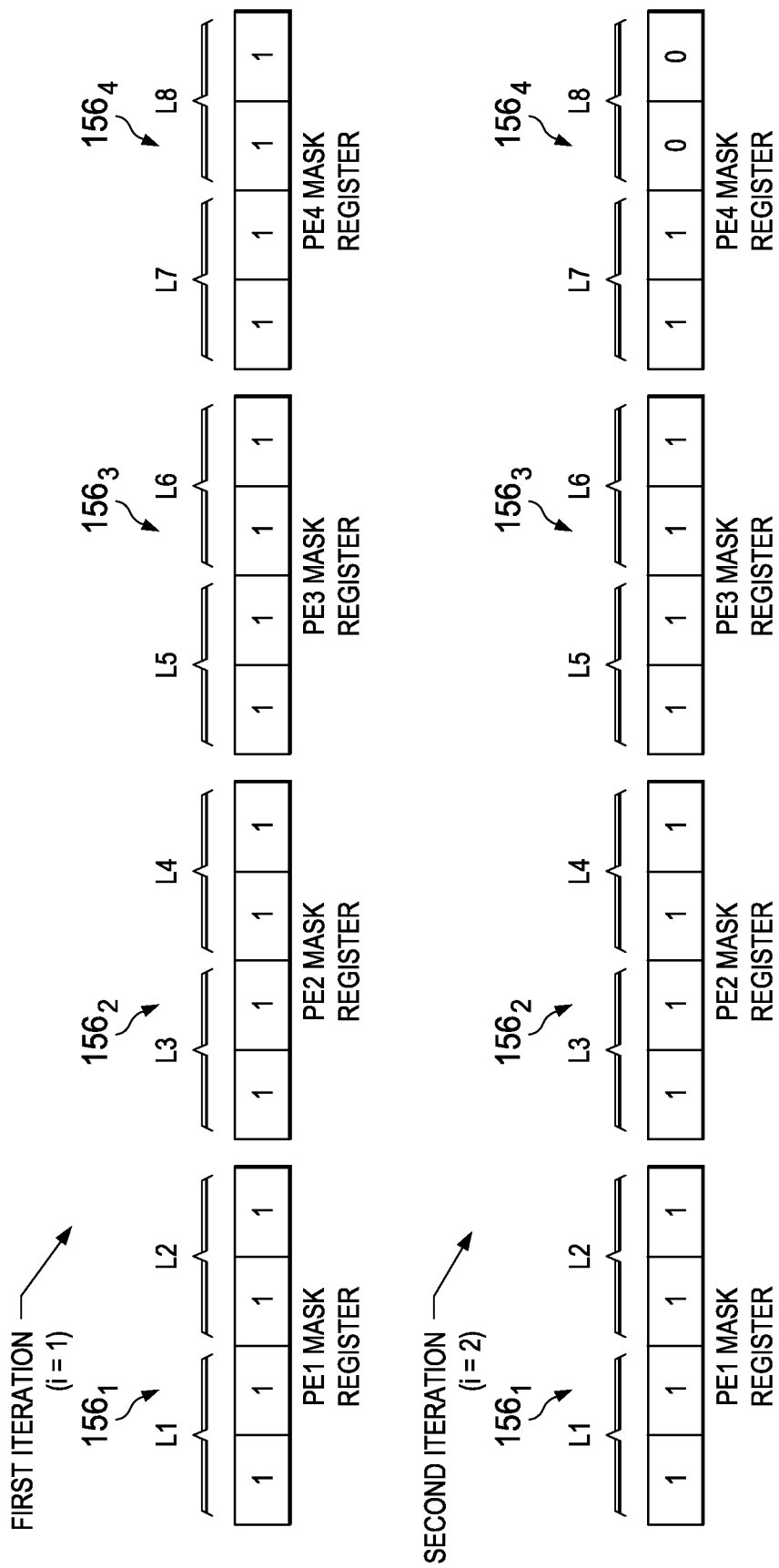
FIG. 7 schematically illustrates example settings of mask registers during different iterations of a loop using the method of FIG. 6 according to various aspects of the present disclosure.

FIG. 7 illustrates a group of mask registers set during different iterations of a vectorizable loop using the method 200 of FIG. 6 according to various aspects of the present disclosure. In the example where the digital signal processor 100 includes the four processing elements PE1, PE2, PE3, and PE4 that support 2×16-bit SWAR processing, FIG. 7 illustrates an example of the mask registers $156_1$, $156_2$, $156_3$, and $156_4$ set during different iterations of a loop associated with processing a vector having a vector length of fifteen (N=15). Implementing the method 200, the digital signal processor 100 determines (at block 220) that the loop count is two (LoopCount=ceil (N/NLanes)=ceil (15/8)=2). Since the loop count does not equal one (at block 230), the digital signal processor 100 sets (at block 240) all the mask bits of the mask registers $156_1$, $156_2$, $156_3$, and $156_4$ to "1" for the first iteration of the loop (i=1), performs the first iteration (at block 250), and decrements the loop count (at block 260). Since the loop count in the present example is two, the digital signal processor 100 determines that the decremented loop count is one (at block 230) and proceeds to set the mask bits (at block 270) of the mask registers $156_1$, $156_2$, $156_3$, and $156_4$ for the second, last iteration of the loop (i=2). In particular, the mask bits corresponding with processing lanes L1-L7 are set to "1" and the mask bits corresponding with processing lane L8 are set to "0" so that processing lane L8 is disabled from executing the instruction when the digital signal processor 100 performs (at block 280) the last iteration of the loop.

Returning to FIG. 1, the digital signal processor 100 can also conditionally execute instructions on a per processing lane basis. For example, as noted above, the processing elements PE1, PE2, PE3, . . . PEN have associated predicate registers $158_1$, $158_2$, $158_3$, . . . $158_N$. Similar to the mask registers, the predicate registers $158_1$, $158_2$, $158_3$, . . . $158_N$ have a number of predicate bits (a width) equal to the maximum number of divisible lanes of the registers of its associated processing element PE1, PE2, PE3, . . . PEN, where the predicate bits correspond with lanes of the associated processing element PE1, PE2, PE3, . . . PEN. In the example where the digital signal processor 100 includes processing elements PE1, PE2, PE3, and PE4 having 32-bit wide general purpose register sets that support 1×32-bit, 2×16-bit, and/or 4×8-bit SWAR operations, a maximum number of divisible processing lanes is four and the associated predicate registers $158_1$, $158_2$, $158_3$, and $158_4$ include four predicate bits (in other words, a four bit wide predicate register). As described further below, the digital signal processor 100 initially sets all predicate bits and then uses a number of the predicate bits for conditional execution of instructions based on the number of processing lanes. For example, the digital signal processor 100 uses all four predicate bits when performing 4×8-bit SWAR operations to conditionally execute instructions for each of the four processing lanes, two of the predicate bits when performing 2×16-bit SWAR operations to conditional execute instructions for each of the two processing lanes, and one of the predicate bits when performing 1×32-bit operations to conditionally execute instructions for the single processing lane. Which bits of the predicate register are used (selected) for determining whether the instructions are conditionally executed depends on design requirements of the digital signal processor 100. In alternative embodiments, instead of the processing elements PE1, PE2, PE3, . . . PEN having respective predicate registers $158_1$, $158_2$, $158_3$, . . . $158_N$, the digital signal processor 100 can include a single predicate register having a number of predicate bits (a width) equal to a maximum number of processing lanes supported by the digital signal processor 100.

The predicate bits associated with each processing element PE1, PE2, PE3, . . . PEN (and particularly corresponding with the processing lanes) can be set by the control unit 110 or respective processing element PE1, PE2, PE3, . . . PEN during program execution. The digital signal processor 100 sets all predicate bits of the predicate registers $158_1$, $158_2$, $158_3$, . . . $158_N$ based on a condition of their corresponding processing lanes, irrespective of a number of data elements processed in parallel by their associated elements PE1, PE2, PE3, . . . PEN. And, when an instruction specifies an operation that has less data elements than the number of predicate bits associated with the processing element, a condition in a processing lane is used to set all predicates associated with that lane. The processing elements PE1, PE2, PE3, . . . PEN can perform compare operations to set the predicate bits of their respective predicate registers $158_1$, $158_2$, $158_3$, . . . $158_N$. For example, where the processing elements PE1, PE2, PE3, and PE4 have 32-bit wide general purpose register sets for implementing 1×32-bit and 2×16-bit SWAR operations, a maximum number of divisible processing lanes is two and thus the associated predicate registers $158_1$, $158_2$, $158_3$, and $158_4$ include two predicate bits, where one predicate bit corresponds with each processing lane when performing 2×16-bit operations. In operation, consider a situation where the processing element PE1 may be instructed to execute a one element operation (1×32-bit operation) or a two element operation (2×16-bit operation). According to aspects of the present disclosure, both predicate bits of the associated predicate register $158_1$ will be set irrespective of whether the processing element PE1 will perform the 1×32-bit operation or the 2×16-bit operation (in other words, a state of both predicate bits is initially TRUE). Then, the digital signal processor 100 performs comparison operations based on a condition of the registers of the processing element PE1 to determine how to set a state of the predicate bits. Accordingly, as an example, for a 32-bit predicated load instruction, when the digital signal processor 100 performs a 2×16-bit comparison operation, each predicate bit may be set differently causing the 32-bit predicated load instruction to conditionally load each of two 16-bit data operands, whereas when the digital signal processor 100 performs a 1×32-bit comparison, both predicate bits may be set the same causing the 32-bit predicated load instruction to conditionally load the 32-bits as a single data operand.

In contrast to the mask bits, the predicate bits control conditional execution of the instruction by their corresponding processing lanes, essentially controlling whether an operation defined by the instruction is performed by their corresponding lanes. In various implementations, the predicate bits can facilitate conditional execution of an instruction within a loop or outside a loop. For example, the digital signal processor 100 (or processing elements PE1, PE2, PE3, . . . PEN) causes lanes having corresponding predicate bits of a first state (for example, TRUE) to perform the operation defined by the instruction and lanes having corresponding predicate bits of a second state (for example, FALSE) to not perform the operation defined by the instruction. What indicates the first state (such as "TRUE") and second state (such as "FALSE") can vary depending on design requirements of the digital signal processor 100. In an example, the first state and the second state associated with the predicate bits is the same as that associated with the mask bits. In another example, the first state and the second state associated with the predicate bits is different than that associated with the mask bits. In various implementations, the first state is "TRUE" when the predicate bit has a value of "1" and the second state is "FALSE" when the predicate bit has a value of "0", such that lanes having corresponding predicate bits with a value of "1" are enabled to execute an instruction and lanes having corresponding predicate bits with a value of "0" are disabled from executing the instruction. In other implementations, the first state is "TRUE" when the predicate bit has a value of "0" and the second state is "FALSE" when the predicate bit has a value of "1", such that lanes having corresponding predicate bits with a value of "0" are enabled to execute an instruction and lanes having corresponding predicate bits with a value of "1" are disabled from executing the instruction.

The digital signal processor 100 can also perform reduction operations across as well as within each processing element PE1, PE2, PE3, . . . PEN (in other words, on a per processing (SWAR) lane basis). For example, in one instruction, the digital signal processor 100 can perform an operation across the SWAR lanes of a respective processing element, such as summing across the SWAR lanes, moving data across the SWAR lanes, performing minimum operations across the SWAR lanes, performing maximum operations across the SWAR lanes, performing other operations across the SWAR lanes, or combinations thereof. In an example where a summing operation is performed by the digital signal processor 100, the reduction operation can sum individual SWAR lanes of each processing element PE1, PE2, PE3, . . . PEN to obtain a result for each processing element PE1, PE2, PE3, . . . PEN and then sum the results of the processing elements PE1, PE2, PE3, . . . PEN. In an example, where a minimum or maximum operation is performed by the digital signal processor 100, the minimum/maximum operation is first performed on individual SWAR lanes of each processing element PE1, PE2, PE3, . . . PEN to obtain a result for each processing element PE1, PE2, PE3, . . . PEN and then the minimum/maximum can be determined from the results of the processing elements PE1, PE2, PE3, . . . PEN.

The digital signal processor 100 can also independently generate addresses on a per processing (SWAR) lane basis. Independently generating addresses facilitates satisfying memory load/store requests from individual processing lanes in a single instruction. Such a feature is particularly useful with non-unity stride data situations. In various implementations, the digital signal processor 100 can include an address offset register per SWAR lane, such that an address for each SWAR lane is represented by a base address plus an offset. In situations where the data tends to be contiguous, the digital signal processor 100 may not necessarily support independent address generation, and the memory load/store requests can be satisfied in separate instructions.

Programming requirements for implementing SWAR parallelism is significantly alleviated by implementing the digital signal processor architecture and associated methods described herein. For example, in conventional digital signal processors, a programmer must explicitly define a non-standard data type and a number of lanes for parallel processing. In an example, for a digital signal processor that implements 2×32-bit SWAR operations in 64-bit registers, a simple finite impulse response (FIR) filter kernel for a multiply-and-accumulate operation may be written as follows in an extension of C/C++ programming language, such as float2:

```
void fir(float *x, float *h, float *y, int nh, int ny) {
    float2 *yp = (float2*)y;
    for(int j = PE; j < ny/2; j += 2*NPE) {
        float2 sum = 0;
        for(int i = 0; i < nh; i++) {
            float2 *xp = (float2*)(x+i); sum += h[i] * xp[j];
        }
        yp[j] = sum;
    }
}
```

Note that the programming language explicitly specifies a special data type, float2, and a number of processing lanes (2*NPE) for parallel processing of the FIR kernel. The programmer essentially has to explicitly program the two levels of parallelism: one level of parallel processing within the processing elements (utilizing SWAR) and another level of parallel processing across the processing elements. In contrast, for the digital signal processor 100, the programmer does not have to specify the data type or explicitly program the two levels of parallelism. Instead, the digital signal processor 100 views each of the processing lanes as a processing element, such that the simple finite impulse response (FIR) filter kernel for the multiply-and-accumulate operation may be written as follows in C/C++ programming language:

```
void fir(float *x, float *h, float *y, int nh, int ny) {
    for(int j = PE; j < ny; j += NPE) {
        float sum = 0;
        for(int i = 0; i < nh; i++)
            sum += x[i + j] * h[i];
        y[j] = sum;
    }
}
```

The digital signal processor 100 thus achieves SWAR parallelism seamlessly without significant programming efforts required by the programmer. Different embodiments may have different advantages, and no advantage is necessarily required of any embodiment.

Although the present disclosure describes processing elements PE1, PE2, PE3, . . . PEN having an associated mask register and an associated predicate register, the present disclosure contemplates a digital signal processor architecture where the processing elements PE1, PE2, PE3, . . . PEN have a single masking register (a consolidated mask register and predicate register) that includes bits that serve (operate) as mask bits or predicate bits as described above. The masking register includes a number of bits (a width) equal to the maximum number of divisible lanes of the registers of its associated processing element PE1, PE2, PE3, . . . PEN, where the bits correspond with lanes of the associated processing element PE1, PE2, PE3, . . . PEN. In the example where the digital signal processor 100 includes processing elements PE1, PE2, PE3, and PE4 having 32-bit wide general purpose register sets that support 1×32-bit, 2×16-bit, and/or 4×8-bit SWAR operations, a maximum number of divisible processing lanes is four and a masking register (a mask/predicate register) associated with each processing element PE1, PE2, PE3, and PE4 includes four bits (in other words, a four bit wide masking register). Each bit of the masking register serves as a mask bit and a predicate bit depending on an operation to be performed by the digital signal processor 100. Accordingly, as described in detail above, loop instructions can set masks and compare instructions can set predicates, where the loop instructions and the compare instructions set a same set of bits.

Further, although the present disclosure describes the parallel processing architecture with reference to a digital signal processor, the present disclosure contemplates the parallel processing architecture described herein for use in any processor that can perform parallel operations, including a microprocessor, a microcontroller, a general purpose computer, or any other processor that can perform parallel operations. The specifications, dimensions, and relationships outlined herein (for example, the number of processing elements and memory banks, logic operations, load values, etc.) have only been offered for purposes of example and teaching only. Each of these may be varied considerably without departing from the spirit of the present disclosure, or the scope of the appended claims. The specifications apply only to one non-limiting example and, accordingly, they should be construed as such. In the foregoing description, example embodiments have been described with reference to particular processor arrangements. Various modifications and changes may be made to such embodiments without departing from the scope of the appended claims. The description and drawings are, accordingly, to be regarded in an illustrative rather than a restrictive sense. Further, the operations and steps described with reference to the preceding FIGURES illustrate only some of the possible scenarios that may be executed by, or within, the digital signal processor 100 of FIG. 1. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

In one example embodiment, the digital signal processor 100 of FIG. 1 is coupled to a motherboard of an associated electronic device. The motherboard can be a general circuit board that can hold various components of the internal electronic system of the electronic device and, further, provide connectors for other peripherals. More specifically, the motherboard can provide the electrical connections by which the other components of the system can communicate. Any suitable processors (inclusive of digital signal processors, microprocessors, supporting chipsets, etc.), memory elements, etc. can be suitably coupled to the motherboard based on particular configuration needs, processing demands, computer designs, etc. Other components such as external storage, controllers for video display, sound, and peripheral devices may be attached to the motherboard as plug-in cards, via cables, or integrated into the motherboard itself. In another example embodiment, the digital signal processor 100 of FIG. 1 may be embedded in standalone modules (e.g., a device with associated components and circuitry configured to perform a specific application or function) or integrated as plug-in modules into application specific hardware of electronic devices.

Note that particular embodiments of the present disclosure may readily include a system on chip (SOC) central processing unit (CPU) package. An SOC represents an integrated circuit (IC) that integrates components of a computer or other electronic system into a single chip. It may contain digital, analog, mixed-signal, and often radio frequency functions: all of which may be provided on a single chip substrate. Other embodiments may include a multi-chip-module (MCM), with a plurality of chips located within a single electronic package and configured to interact closely with each other through the electronic package. In various other embodiments, the digital signal processing functionalities may be implemented in one or more silicon cores in application specific integrated circuits (ASICs), field programmable gate arrays (FPGAs), and other semiconductor chips.

In example implementations, at least some portions of the processing activities outlined herein may be implemented in software in, for example, the control unit 110. In some embodiments, one or more of these features may be implemented in hardware, provided external to the elements of the FIGURES, or consolidated in any appropriate manner to achieve the intended functionality. The various components may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, the digital signal processor 100 of FIG. 1 described herein (and/or its associated structures) may also include suitable interfaces for receiving, transmitting, and/or otherwise communicating data or information in a network environment. Additionally, some of the components associated with the described processors may be removed, or otherwise consolidated. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, equipment options, etc.

Any suitable processor component can execute any type of instructions associated with the data to achieve the operations detailed herein. In one example, the digital signal processor of FIG. 1 could transform an element or an article (for example, data) from one state or thing to another state or thing. In another example, the activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof. In operation, the digital signal processor 100 of FIG. 1 may keep information in any suitable type of non-transitory storage medium (for example, random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. Further, the information being tracked, sent, received, or stored in the digital signal processor 100 could be provided in any database, register, table, cache, queue, control list, or storage structure, based on particular needs and implementations, all of which could be referenced in any suitable timeframe. Any of the memory items discussed herein should be construed as being encompassed within the broad term "memory." In some example embodiments, one or more memory elements (for example, memory 120, program memory 116, etc.) can store data used for the operations described herein. This includes the memory element being able to store instructions (for example, software, logic, code, etc.) in non-transitory media such that the instructions are executed to carry out the activities described herein. Similarly, any of the potential processing elements, modules, and machines described herein should be construed as being encompassed within the broad term "processor."

Computer program logic implementing all or part of the functionality described herein is embodied in various forms, including, but in no way limited to, a source code form, a computer executable form, and various intermediate forms (for example, forms generated by an assembler, compiler, linker, or locator). In an example, source code includes a series of computer program instructions implemented in various programming languages, such as an object code, an assembly language, or a high-level language such as Fortran, C, C++, JAVA, or HTML for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "steps for" are specifically used in the particular claims; and (b) does not intend, by any statement in the specification, to limit this disclosure in any way that is not otherwise reflected in the appended claims.

EXAMPLE EMBODIMENT IMPLEMENTATIONS

One particular example implementation may include means for (for example, software, logic, code, hardware, or a combination thereof) issuing an instruction to a processing element that includes a register divisible into processing lanes for parallel processing; setting mask bits corresponding with the processing lanes; setting predicate bits corresponding with the processing lanes; and executing, by at least one of the processing lanes, the instruction. Various implementations may further include means for enabling processing lanes having corresponding mask bits of a first state to execute the instruction; disabling processing lanes having corresponding mask bits of a second state from executing the instruction; performing an operation defined by the instruction in lanes having corresponding predicate bits of a third state; and/or not performing the operation defined by the instruction in lanes having corresponding predicate bits of a fourth state. Various implementations may include means for determining a loop count of a loop associated with the instruction; if the loop count is not equal to one, setting all the mask bits to the first state; if the loop count is equal to one, setting each of the mask bits to the first state or the second state based on a trip count of the loop. Various implementations may include means for setting the predicate bits to the third state or the fourth state based on a condition of the processing lane that corresponds with the predicate bits. In an example, the setting includes setting the predicate bits to the third state; and performing a comparison operation to determine whether any of the predicate bits should be changed to the fourth state. In an example, a number of predicate bits is greater than a number of processing lanes, such that a processing lane has more than one corresponding predicate bit; and the setting includes setting the more than one corresponding predicate bit of the processing lane based on a condition of the processing lane. Various implementations may include means for performing operations across processing lanes, such as summing across processing lanes and/or moving data across processing lanes. Various implementations may include means for independently generating addresses for each processing lane.

What is claimed is:

1. An apparatus, comprising:
a processor that includes:
one or more processing elements having one or more compute units and one or more register files, wherein the one or more register files includes one or more registers divisible into lanes for parallel processing; and
one or more mask registers associated with the one or more processing elements, wherein the one or more mask registers include a number of mask bits, such that the lanes have corresponding mask bits, wherein the one or more processing elements are operable to set each of the mask bits to a first state or a second state when a loop count of a loop of an operation associated with an instruction indicates that the operation is in a last iteration of the loop, and are operable to set all of the mask bits to the first state otherwise,
wherein the one or more processing elements are operable to enable lanes having corresponding mask bits of the first state to execute the instruction and disable lanes having corresponding mask bits of the second state from executing the instruction.

2. The apparatus of claim 1, wherein the processor further includes one or more predicate registers associated with the one or more processing elements, wherein the one or more predicate registers include a number of predicate bits equal to the maximum number of divisible lanes, such that the lanes have corresponding predicate bits.

3. The apparatus of claim 2, wherein the one or more processing elements are further operable to:
perform an operation defined by the instruction in lanes having corresponding predicate bits of a third state; and
not perform the operation defined by the instruction in lanes having corresponding predicate bits of a fourth state.

4. The apparatus of claim 3, wherein:
the first digital state and the third digital state are a same state; and
the second digital state and the fourth digital state are a same state.

5. The apparatus of claim 3, wherein the one or more processing elements are operable to set the predicate bits to the third state or the fourth state based on a condition of the lane that corresponds with the predicate bits.

6. The apparatus of claim 2, wherein a lane has more than one corresponding predicate bit and the one or more processing elements are operable to set all corresponding predicate bits based on a condition of the lane.

7. The apparatus of claim 2, wherein a single consolidated register implementations the mask register and the predicate register, the single consolidated register comprising a number of bits configured to serve either as the mask bits or as the predicate bits.

8. The apparatus of claim 1, wherein, for the last iteration of the loop, the one or more processing elements are operable to set the mask bits to the first state or the second state based on a trip count of the loop.

9. The apparatus of claim 1, wherein the processor is operable to perform a reduction operation across the lanes of the one or more of the processing elements.

10. The apparatus of claim 9, wherein the reduction operation comprises one or more of summing across the lanes of the one or more processing elements, moving data across the lanes of the one or more processing elements, performing minimum operations across the lanes of the one or more processing elements, and performing maximum operations across the lanes of the one or more processing elements.

11. The apparatus of claim 1, wherein the processor is operable to generate an address for each of the lanes of the one or more processing elements.

12. The apparatus of claim 1, wherein the one or more processing elements are operable to:
set all the mask bits to the first state if the loop count is not equal to one; and
set each of the mask bits to the first state or the second state based on a trip count of the loop if the loop count is equal to one.

13. The apparatus of claim 1, wherein the number of mask bits is equal to a maximum number of divisible lanes of the one or more registers.

14. The apparatus of claim 1, wherein the one or more processing elements are further operable to execute the instruction by at least one of the processing lanes.

15. A method to be performed by a processor, the method comprising:
issuing an instruction to one or more processing elements which include one or more registers divisible into processing lanes for parallel processing;
setting each of mask bits corresponding with the processing lanes to a first state or a second state when a loop count of a loop of an operation associated with the instruction indicates that the operation is in a last iteration of the loop and setting all of the mask bits to the first state otherwise;
enabling processing lanes having corresponding mask bits of the first state to execute the instruction; and
disabling processing lanes having corresponding mask bits of the second state from executing the instruction.

16. The method of claim 15, wherein a number of mask bits is equal to a maximum number of divisible processing lanes of the one or more registers.

17. The method of claim 15, further comprising:
setting predicate bits corresponding with the processing lanes.

18. The method of claim 17, further comprising:
performing an operation defined by the instruction in lanes having corresponding predicate bits of a third state; and
not performing the operation defined by the instruction in lanes having corresponding predicate bits of a fourth state.

19. The method of claim 18, wherein setting the predicate bits includes setting the predicate bits to the third state or the fourth state based on a condition of the processing lane that corresponds with the predicate bits.

20. The method of claim 18, wherein:
the first digital state and the third digital state are a same state; and
the second digital state and the fourth digital state are a same state.

21. The method of claim 18, wherein:
the first digital state and the fourth digital state are a same state; and
the second digital state and the third digital state are a same state.

22. The method of claim 17, wherein:
a number of predicate bits is greater than a number of processing lanes, such that a processing lane has more than one corresponding predicate bit; and
the setting the predicate bits includes setting the more than one corresponding predicate bit of the processing lane based on a condition of the processing lane.

23. The method of claim 17, wherein a number of predicate bits is equal to the maximum number of divisible processing lanes.

24. The method of claim 15, wherein setting the mask bits corresponding with the processing lanes includes:
if the loop count is not equal to one, setting all the mask bits to the first state;
if the loop count is equal to one, setting each of the mask bits to the first state or the second state based on a trip count of the loop.

25. The method of claim 24, wherein, when the loop count is equal to one, each of the mask bits are set according to MASK=2^(Remainder((VectorLength+NLanes−1)/NLanes)+1)−1, wherein VectorLength is a vector length of a vectorizable loop associated with the operation, and NLanes is a number of the processing lanes.

26. The method of claim 15, further comprising:
executing, by at least one of the processing lanes, the instruction.

27. The method of claim 15, further comprising performing a reduction operation across the lanes of one or more processing elements.

28. The method of claim 15, further comprising performing a reduction operation within at least one of the one or more processing elements.

29. The method of claim 15, further comprising determining the loop count of the operation based on a vector length of a vectorizable loop associated with the operation and a number of the processing lanes.

30. The method of claim 15, further comprising generating an address for each of the lanes of the one or more processing elements.

31. A single instruction, multiple data (SIMD) processor, comprising:
a compute array having one or more processing element that includes a register set divisible into a number of SIMD lanes; and
one or more mask registers having a number of mask bits, such that each SIMD lane has at least one corresponding mask bit,
wherein the one or more processing elements are operable to:
set each of the mask bits to a first state or a second state when a loop count of a loop of an operation associated with an instruction indicates that the operation is in a last iteration of the loop, and set all of the mask bits to the first state otherwise,
enable the SIMD lanes having corresponding mask bits of the first state to execute the instruction, and
disable the SIMD lanes having corresponding mask bits of the second state from executing the instruction.

32. The SIMD processor of claim 31, further comprising:
one or more predicate registers having a number of predicate bits equal to a maximum number of divisible SIMD lanes, such that each SIMD lane has at least one corresponding predicate bit.

33. The SIMD processor of claim 32, wherein the one or more processing elements are further operable to:

perform an operation defined by the instruction in SIMD lanes having corresponding predicate bits of a third state; and not perform the operation defined by the instruction in SIMD lanes having corresponding predicate bits of a fourth state.

34. The SIMD processor of claim 31, wherein the one or more processing elements are further operable to conditionally execute the instruction in at least one of the SIMD lanes at least based on a state of the mask bits.

35. An apparatus comprising:

means for issuing an instruction to one or more processing elements that include one or more registers divisible into processing lanes for parallel processing;

means for setting each of mask bits corresponding with the processing lanes to a first state or a second state when a loop count of a loop of an operation associated with the instruction indicates that the operation is in a last iteration of the loop, and setting all of the mask bits to the first state otherwise;

means for enabling processing lanes having corresponding mask bits of the first state to execute the instruction; and means for disabling processing lanes having corresponding mask bits of the second state from executing the instruction.

36. The apparatus of claim 35, further comprising:

means for setting predicate bits corresponding with the processing lanes.

* * * * *